Figure 1:
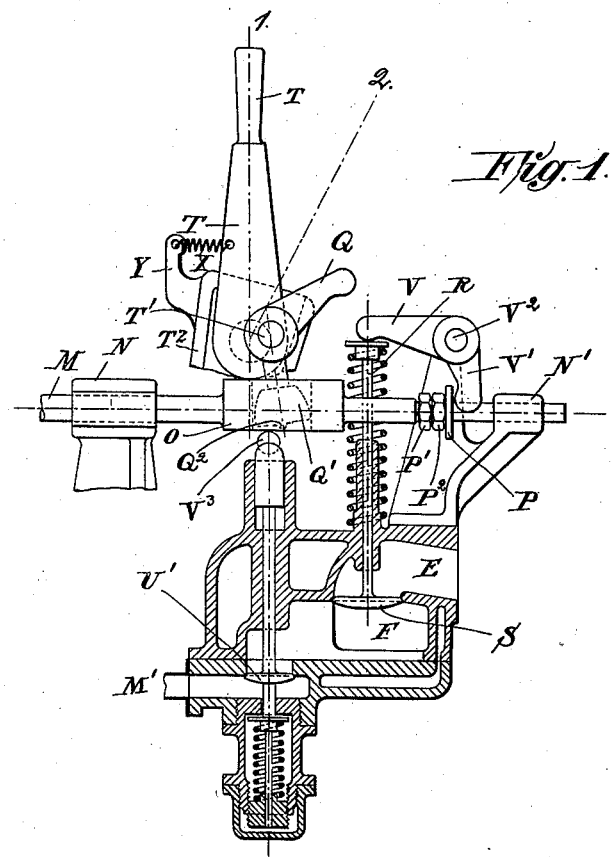

No. 655,751. Patented Aug. 14, 1900.
H. A. BERTHEAU.
VALVE GEAR FOR PETROLEUM ENGINES.
(Application filed Jan. 30, 1899.)

(No Model.)

Witnesses:

Inventor
Henrik August Bertheau
by
Atty.

UNITED STATES PATENT OFFICE.

HENRIK AUGUST BERTHEAU, OF STOCKHOLM, SWEDEN.

VALVE-GEAR FOR PETROLEUM-ENGINES.

SPECIFICATION forming part of Letters Patent No. 655,751, dated August 14, 1900.

Application filed January 30, 1899. Serial No. 703,930. (No model.)

*To all whom it may concern:*

Be it known that I, HENRIK AUGUST BERTHEAU, of Stockholm, Sweden, have invented certain new and useful Improvements in Devices for Putting in Motion and the Regulation of Gas and Petroleum Engines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to starting and valve-operating mechanism for gas and petroleum engines whereby during the starting the engine can be changed from a four to a two stroke cycle, and is especially applicable to engines such as described in my application for patent filed June 14, 1898, Serial No. 666,730, wherein a gas under pressure or the gaseous products of combustion are used for starting.

The valves are operated by a rod driven from a crank-shaft or other moving part of the engine in a manner similar to engines of ordinary construction.

The said valve operating and starting device is illustrated in the drawings as applied to a horizontal-cylinder petroleum-engine, in which—

Figure 2:
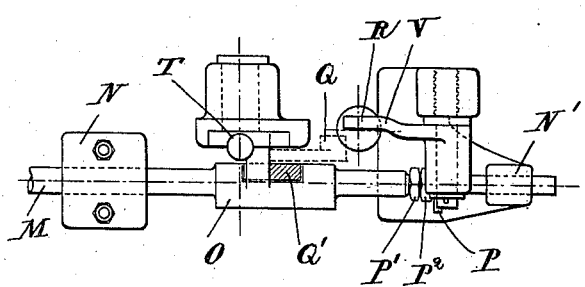

Figure 1 is an elevation, partly in section; and Fig. 2 is a plan view of the same.

S is the exhaust-valve, held on its seat by a spiral spring around its spindle R and opening into the exhaust-passage E.

U' is a spring-seated valve carrying on the end of its spindle a contact-roller V³ and controls the stored pressure gas or gaseous products of combustion that come from the exhaust-passage F between the valves S and U', pass through the port controlled by said valve U' and the passage M' to the pressure-gas holder, (not shown,) where they are stored for use when needed to start the engine and wherein the pressure is kept within the required limits by the ordinary means used for such purposes. When the pressure beneath the valve U' is equal to or nearly equal to the pressure of the exploded gases, this valve under normal working will remain closed and all the gases will be exhausted into the atmosphere.

M is the valve-rod, operated from a moving part of the engine, and has imparted to it, as is customary, a reciprocating motion which in a four-cycle engine will make one reciprocation (move to and fro once) while the engine is making two revolutions. This rod M passes through and is supported in two bearings N and N', and between which bearings it is provided with a forked enlargement O, adapted to move an arm Q' of a bell-crank lever, which is pivoted at T' eccentrically on the starting-lever T, said lever T being itself pivoted on a bracket T², (only part of which is shown.) The lever T, shown in the position of normal running of the engine, is held in such position by means of a spring X, attached to a projection Y on the supporting-bracket T². The rod M also carries a plate P, adjustable along said rod by means of nuts P' and P² and which acts as a tappet on an arm V' of a second bell-crank lever, which latter is pivoted at V² in a suitable bracket. The other arm V of this bell-crank lever acts as a tappet on the spindle R of the exhaust-valve.

The fork O moves the arm Q' of the bell-crank lever back and forth and imparts an equal motion to the other arm Q thereof. When the starting-lever T is thrown over from position 1 to position 2, both of the arms Q' and Q are lowered, the bell-crank being pivoted on the starting-lever T eccentrically, thus allowing the projection Q² on the arm Q' to fall into the path of the roller V³, controlling the pressure-gas outlet. At the same time the arm Q is in a position to act as a tappet on the exhast-valve spindle R.

The operation is as follows: In starting an engine of the class described and to which my device is applied the fly-wheel is turned by hand so that the piston will be in a position to begin its stroke. The starting-lever T is then thrown from position 1 to position 2, which lowers the relative positions of the arms Q and Q' of the bell-crank lever, and the valve U' is depressed by reason of the projection Q² coming in contact with the roller V³ on the end of the spindle. Gas under pressure is thereby admitted to the cylinder through the passage F and the piston is driven out. The rod M, continuing its motion—say to the left—will move the arm Q² in the same direction, turn the bell-crank and cause the arm Q to strike the spindle R of the exhaust-valve S, and allow the expanded gas to exhaust through the passage E, the piston being on return stroke, thus completing a two-stroke cycle. The valve-rod then makes its return stroke—say moving to the right—the end of the arm Q' traveling with it. The projection Q² again operates the valve U' and admits a second supply of gas under pressure to the cylinder, as above described, and the piston starts on its second stroke, while by the time the valve-rod is about completing its return stroke the piston is on its second return stroke. At this time the disk or tappet P engages the arm V' of the second bell-crank lever and causes the arm V to contact with the spindle R of the exhaust-valve S, exhausting again through E, completing another two-stroke cycle. The engine is allowed to work in this manner until it has acquired sufficient speed to run as a four-stroke-cycle engine, when the lever T is released and returned to position 1 by the spring X, when the bell-crank Q Q' will be thrown out of effective operation, thus producing a four-stroke-cycle engine. The piston will then draw in from a mixing-chamber (not shown) explosive mixture on its forward stroke and compress it on its return, the valve-rod M meanwhile having completed its forward stroke. The compressed gas is exploded, causing the piston to travel on its second forward stroke, and on its second return-stroke exhausts, the valve-rod M having meanwhile completed its return-stroke, the tappet P actuating the bell-crank V' V, which in turn opens the exhaust-valve S. The exhaust-gases will partly pass through the valve U' to be stored for future use in starting the engine and partly through the exhaust-valve and passage E into the atmosphere.

Having thus described my invention, what I claim as new therein, and desire to secure by Letters Patent, is—

1. In a hydrocarbon-motor, a spring-held exhaust-valve and its operating mechanism, a passage leading to the exhaust-valve, a spring-held valve in said passage to control non-explosive gas under pressure, a bell-crank lever and its operating mechanism, said bell-crank lever arranged to actuate said spring-held valve and the exhaust-valve at periods intermediate the times at which said exhaust-valve is normally actuated by its operating mechanism, substantially as described.

2. In a hydrocarbon-motor, a spring-actuated exhaust-valve and its operating mechanism, a passage leading to the exhaust-valve, a spring-held valve in said passage to control non-explosive gas under pressure, a bell-crank lever actuated by the exhaust-valve-operating mechanism arranged to actuate said spring-held valve and the exhaust-valve at periods intermediate the times at which said exhaust-valve is normally actuated by its operating mechanism, and devices to cause said bell-crank lever to run idle thereby converting the engine from a two-stroke-cycle to a four-stroke-cycle engine, substantially as described.

3. In a hydrocarbon-motor, a spring-actuated exhaust-valve, a rod and tappet arranged to operate the same, a passage leading to said exhaust-valve, a second spring-held valve in said passage controlling non-explosive gas under pressure, a bell-crank, means for operating the same, one arm of said bell-crank arranged to operate the second valve and the other to operate the exhaust-valve and mechanism to cause said bell-crank to run idle, substantially as described.

4. In a hydrocarbon-motor, a spring-actuated exhaust-valve, a rod and tappet arranged to operate the same, a passage leading to said exhaust-valve, a second spring-held valve in said passage controlling non-explosive gas under pressure, a yoke on said rod, a bell-crank operated by said yoke and arranged to operate both valves, substantially as described.

In testimony that I claim the foregoing as my invention I have signed my name in presence of two subscribing witnesses.

HENRIK AUGUST BERTHEAU.

Witnesses:
TH. WAWRINSKY,
M. GENBERG.